M. CHICK.
AUTOMATIC SPOT LIGHT APPARATUS.
APPLICATION FILED APR. 1, 1918.
1,297,543. Patented Mar. 18, 1919.
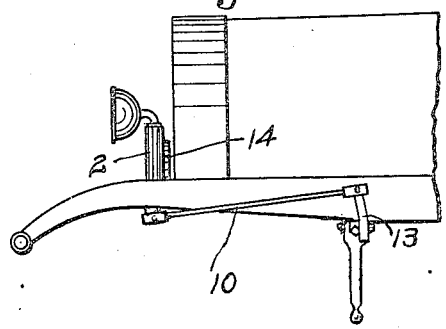
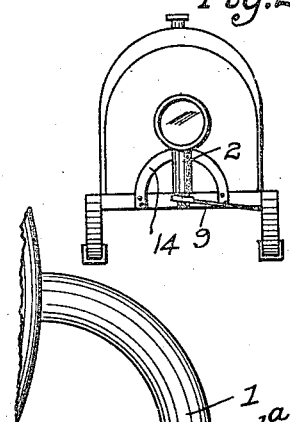
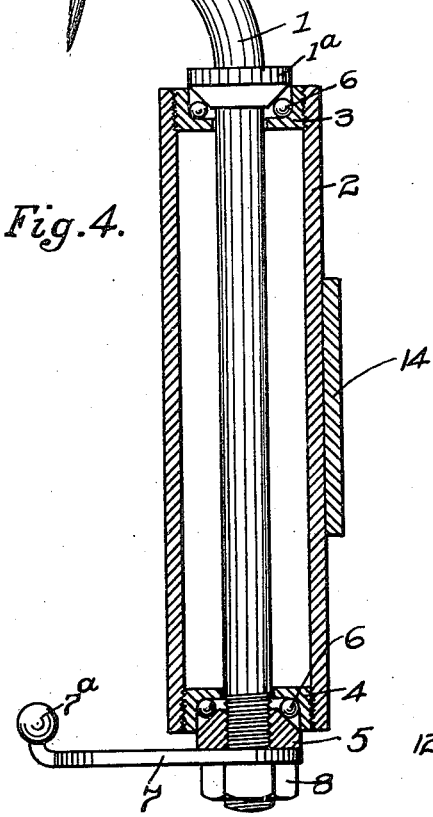
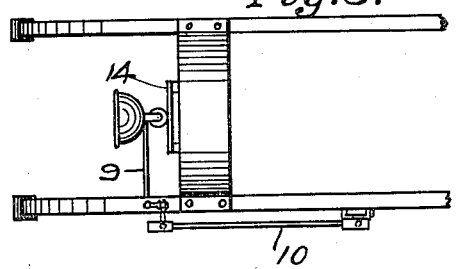
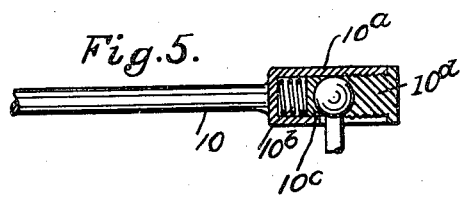
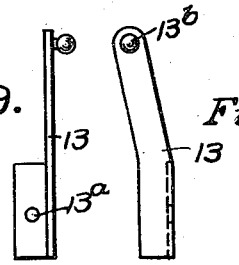
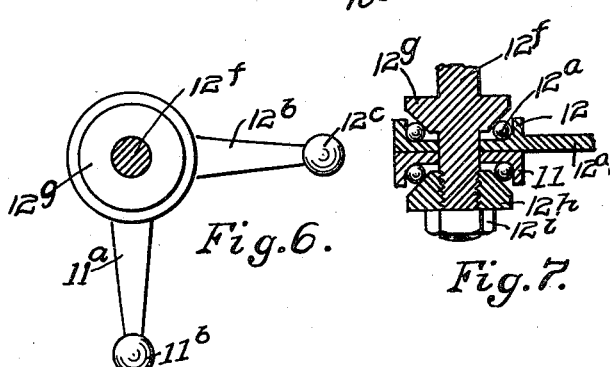
Inventor
Martines Chick
By A. B. Bowman
Attorney

UNITED STATES PATENT OFFICE.

MARTINES CHICK, OF SAN DIEGO, CALIFORNIA.

AUTOMATIC SPOT-LIGHT APPARATUS.

1,297,543.  Specification of Letters Patent.  Patented Mar. 18, 1919.

Application filed April 1, 1918. Serial No. 225,937.

*To all whom it may concern:*

Be it known that I, MARTINES CHICK, a citizen of the United States, residing at San Diego, in the county of San Diego and State of California, have invented certain new and useful Improvements in Automatic Spot-Light Apparatus, of which the following is a specification.

My invention relates to an apparatus for automatically turning a spot light with the turning of the front wheels of a vehicle so that the rays of light are thrown in front of the vehicle at all times, when going around corners or curves as well as when going straight ahead, and the objects of my invention are: first, to provide a spot light to be used for vehicles which is connected with the steering gear of the vehicle so that it turns with the turning of the wheels: second, to provide means for supporting and operating the lamp which is adjustable throughout and so constructed that it will not rattle; third, to provide an apparatus of this class in which the lamp is pivotally mounted upon a support which is rigidly secured to the frame of the vehicle: fourth, to provide a new and novel operating apparatus for spot lights or lamps: fifth, to provide an apparatus of this class which is applicable for use in connection with the various makes of machines now in use with but slight changes in the apparatus and sixth, to provide an apparatus of this class which is simple and economical of construction, durable, easy to operate, easy to install, and which will not readily deteriorate or get out of order.

With these and other objects in view as will appear hereinafter my invention consists of certain novel features of construction, combination, and arrangement of parts as will be hereinafter described in detail and particularly set forth in the appended claims, reference being had to the accompanying drawings and to the characters of reference thereon which form a part of this application, in which:

Figure 1 is a side elevational view of a fragmentary portion of the front frame of a vehicle showing my apparatus mounted in position thereon, Fig. 2, is a front view of a fragmentary portion of the vehicle showing a portion of my apparatus thereon, Fig. 3, is a top or plan view thereof, Fig. 4, is a detailed sectional view of the lamp support, showing some of the parts in elevation to facilitate the illustration, Fig. 5, is a partial elevational and sectional view of one of the connecting bars and the connecting means thereon, Fig. 6, is a top or plan view of the bell crank to which the two connecting levers are connected, Fig. 7, is a fragmentary vertical section thereof, Fig. 8, is an enlarged elevational view of the operating lever and Fig. 9, is an elevational view of the same at a right angle thereto.

Similar characters of reference refer to similar parts throughout the several views of the drawings.

The lamp supporting shaft 1, cylinder 2, bearing cones 3 and 4, cone 5, ball bearings 6, arm 7, lock nut 8, connecting rod 9, connecting rod 10, bell crank member 11, bell crank member 12, operating lever 13, and support 14, constitute the principal parts of my spot light apparatus:

The support 14 is preferably an inverted U shaped bar, as shown best in Figs. 1 and 2 of the drawings and it is preferably secured to that portion of the frame of the vehicle which supports the radiator and extends upwardly to a position in front of the radiator. It will be noted that on different makes of vehicles this U bar may necessarily be changed to throw the lamp farther forward. Secured on this U bar in the middle of the radiator is the cylinder 2, in each end of which is mounted ball bearings 6, in cones 3 and 4. Secured to the shaft 1, is a cone 1ª, which is adapted to fit against the bearings in the cone 3, thus forming a ball bearing at the upper end of the cylinder 2. The lower end of this shaft 2, is threaded externally adapted for the cone 5, which is adapted to rest against the bearings 6 in the cone 4, thus forming a ball bearing at the lower end of the cylinder 2. Both bearings may be readily adjusted by adjusting the cone 5, on the shaft 1, and taking up the slack as desired. On this shaft 1, against the cone is the arm 7, which is provided with a ball 7ª on its outwardly extended end, adapted for one end of the connecting rod 9 and this arm is secured in position by means of the lock nut 8, so that it may be turned in different directions by loosening said nut, the upper end of this shaft 1 is preferably curved forwardly and to the extended end is secured the lamp. The bell crank members 11 and 12 are provided with cup shaped cone members adapted for the ball bearings 12ª and to each is secured an extended arm, the one 11ª and the other 12ᵇ, which are provided with balls 11ᵇ and 12ᶜ adapted to connect with the connecting rods 9 and 10, these bell crank members 11 and 12 are secured rigidly together and are supported on the lower frame of the vehicle by means of the bolt 12ᶠ which is provided with a cone member 12ᵍ thereon adapted to engage the balls 12ª in the cup 12 and the lower end of this bolt 12ᶠ is threaded and, screwed thereon is the cone 12ʰ and this cone is locked in position by means of the lock nut 12ⁱ on the lower end of the bolt, thus forming a ball bearing for the bell crank members 11 and 12 which is adapted to be adjusted to make a good fit and prevent rattling by turning the cone 12ʰ and locking it with a nut 12ⁱ. The operating lever 13 is preferably shaped as shown best in Figs. 8 and 9 of the drawings, a portion of which is made in angle shape and provided with a hole 13ª therein adapted for the bolt which clamps the steering lever in position and the extended end of this lever is offset so that the ball 13ᵇ is in alinement with the middle of the steering lever. It will be noted that this construction provides for turning this lever either upwardly or downwardly in which case the bell crank levers 11 and 12 may be reversed and set farther forward on the frame as desired or the arm 7 may be turned backwardly instead of forwardly, all of which makes it applicable for different makes of vehicles to which it is to be applied. The connecting rods 9 and 10 are simple rods on the extended ends of which are mounted connecting members as shown best in Fig. 5 of the drawings, consisting of a cylindrical member 10ª threaded internally, provided with a spring 10ᵇ in the bottom of said cylinder with a bearing plate 10ᶜ, resting between said spring and a ball on the operating arm and provided with a plug 10ᵈ adapted to screw into the end, the inner end of which fits said ball thus providing a joint in which the wear will be taken up by the spring 10ᵇ forming a joint that will not rattle.

Though I have shown and described a particular construction, combination, and arrangement of parts, I do not wish to be limited to this particular construction, combination and arrangement, but desire to include in the purview of my invention the construction, combination and arrangement substantially as set forth in the appended claims.

It is obvious that with this construction there is provided an automatic spot light apparatus, in which a spot light is pivotally mounted centrally in front of the vehicle and automatically turned with the steering of the vehicle, that the joints of the operating apparatus throughout are adjustable and will not readily rattle or get out of order; that the apparatus may be readily applied to various makes of vehicles with but slight changes.

Having thus described my invention, what I claim as new and desire to secure by Letters Patent is:

1. In an apparatus of the class described, the combination with a spot light, of a shaft revolubly mounted in ball bearings, supporting said spot light, a cylindrical member in each end of which the said ball bearings are mounted, an inverted U bar, rigidly secured to the front frame of the vehicle to which said cylindrical member is secured, an arm adjustably secured to the lower end of said shaft, a connecting rod connected to said arm, a bell crank pivotally mounted on the frame of the vehicle to which the other end of said connecting rod is connected, another connecting rod secured to the other member of said bell crank and a lever secured to the steering lever of the vehicle to which the opposite end of said connecting rod is connected.

2. In an apparatus of the class described, the combination with a spot light, of a shaft revolubly mounted in ball bearings, supporting said spot light, a cylindrical member in each end of which the said ball bearings are mounted, an inverted U bar, rigidly secured to the front frame of the vehicle to which said cylindrical member is secured, an arm adjustably secured to the lower end of said shaft, a connecting rod connected to said arm, a bell crank pivotally mounted on the frame of the vehicle to which the other end of said connecting rod is connected, another connecting rod secured to the other member of said bell crank and a lever convertibly mounted on the steering lever of the vehicle to which the opposite end of said connecting rod is connected.

3. In an apparatus of the class described the combination with a spot light, of a shaft revolubly mounted in ball bearings, supporting said spot light, a cylindrical member in each end of which the said ball bearings are mounted, an inverted U-bar, rigidly secured to the front frame of the vehicle to which said cylindrical member is secured, an arm adjustably secured to the lower end of said shaft, a connecting rod connected to said arm, a bell crank pivotally mounted on the frame of the vehicle to which the other end of said connecting rod is connected, another connecting rod secured to the other member of said bell crank and a lever convertibly mounted on the steering lever of the vehicle to which the opposite end of said connecting rod is connected, and means for adjusting and taking up the slack in the various joints of the apparatus.

In testimony whereof I have hereunto set my hand at San Diego, California, this 23 day of March, 1918.

MARTINES CHICK.